(12) United States Patent
Nambi

(10) Patent No.: US 11,546,315 B2
(45) Date of Patent: Jan. 3, 2023

(54) AUTHENTICATION KEY-BASED DLL SERVICE

(71) Applicant: HEWLETT PACKARD ENTERPRISE DEVELOPMENT LP, Houston, TX (US)

(72) Inventor: Grace Priscilla Nambi, Bangalore (IN)

(73) Assignee: Hewlett Packard Enterprise Development LP, Spring, TX (US)

( * ) Notice: Subject to any disclaimer, the term of this patent is extended or adjusted under 35 U.S.C. 154(b) by 250 days.

(21) Appl. No.: 16/886,700

(22) Filed: May 28, 2020

(65) Prior Publication Data

US 2021/0377236 A1 Dec. 2, 2021

(51) Int. Cl.
*H04L 9/40* (2022.01)
*G06F 9/54* (2006.01)

(52) U.S. Cl.
CPC .............. *H04L 63/08* (2013.01); *G06F 9/544* (2013.01); *H04L 63/062* (2013.01)

(58) Field of Classification Search
CPC ........ H04L 63/08; H04L 63/062; G06F 9/544
See application file for complete search history.

(56) References Cited

U.S. PATENT DOCUMENTS

| | | | | |
|---|---|---|---|---|
| 5,832,219 A * | 11/1998 | Pettus | ...................... | G06F 9/547 709/227 |
| 6,983,326 B1 * | 1/2006 | Vigue | ................... | H04L 67/104 713/168 |
| 7,017,188 B1 * | 3/2006 | Schmeidler | ........... | H04L 63/065 707/999.001 |
| 7,257,597 B1 * | 8/2007 | Pryce | ...................... | G06F 16/25 707/999.102 |
| 7,367,019 B2 | 4/2008 | Mak et al. | | |
| 7,496,898 B1 | 2/2009 | Vu | | |
| 8,214,833 B2 | 7/2012 | Moir et al. | | |
| 8,347,374 B2 * | 1/2013 | Schneider | ........... | H04L 63/0884 726/12 |
| 8,572,739 B1 * | 10/2013 | Cruz | ...................... | G06F 21/566 726/25 |
| 9,197,663 B1 * | 11/2015 | Gilbert | .................... | H04L 63/08 |
| 9,223,554 B1 * | 12/2015 | Lawson | ................ | G06F 21/105 |

(Continued)

OTHER PUBLICATIONS

Dussud, Patrick H., "TICLOS, An Implementation of CLOS for the Explorer Family," Jul. 3, 1989, 5 pages, https://dl.acm.org/doi/pdf/10.1145/74877.74901?download=true.

*Primary Examiner* — Aravind K Moorthy
(74) *Attorney, Agent, or Firm* — Sheppard Mullin Richter & Hampton LLP

(57) ABSTRACT

Systems and methods are provided for implementing an authentication key-based DLL service. For example, the system can expose a list of functionalities and request format, and a byte string denotes a functionality corresponding to the API. Output is received by the user after loading a DLL library maintained by a DLL provider. The system can generate a key corresponding to the functionality and transmit the key to the user. The invocation of the functionality can be performed using the keys. The shared memory space may be used for inputs from the user and outputs of the DLL. The system can perform an action based on the authentication of the keys. During any functionality advancement, the system can notify the user to unload and reload the new DLL in order to make use of the advancements.

20 Claims, 7 Drawing Sheets

(56) References Cited

U.S. PATENT DOCUMENTS

| | | | |
|---|---|---|---|
| 9,774,578 B1* | 9/2017 | Ateniese | H04L 9/0643 |
| 9,781,016 B1* | 10/2017 | Marquardt | H04L 67/18 |
| 9,800,410 B1* | 10/2017 | Clayton | H04L 9/0841 |
| 2002/0016912 A1* | 2/2002 | Johnson | H04L 63/062 |
| | | | 713/165 |
| 2002/0138577 A1* | 9/2002 | Teng | G06F 16/986 |
| | | | 709/205 |
| 2002/0147909 A1* | 10/2002 | Mullen | H04L 63/126 |
| | | | 713/173 |
| 2003/0014435 A1 | 1/2003 | Devillers et al. | |
| 2004/0044739 A1* | 3/2004 | Ziegler | G06Q 20/02 |
| | | | 709/213 |
| 2005/0027871 A1* | 2/2005 | Bradley | G06Q 20/1235 |
| | | | 709/227 |
| 2006/0059287 A1* | 3/2006 | Rivard | G06F 9/4411 |
| | | | 710/300 |
| 2006/0170965 A1* | 8/2006 | Ohara | H04N 1/00204 |
| | | | 358/1.15 |
| 2007/0067623 A1* | 3/2007 | Ward | G06F 21/554 |
| | | | 713/164 |
| 2007/0240222 A1* | 10/2007 | Tuvell | H04W 12/128 |
| | | | 726/24 |
| 2007/0271282 A1* | 11/2007 | Boren | G06F 8/34 |
| 2008/0005388 A1* | 1/2008 | Hara | G06F 9/544 |
| | | | 710/22 |
| 2009/0182802 A1* | 7/2009 | Tran | H04L 41/046 |
| | | | 709/221 |
| 2009/0241131 A1* | 9/2009 | Needamangala | G06F 9/54 |
| | | | 719/327 |
| 2010/0077411 A1* | 3/2010 | Comer | G06F 9/44521 |
| | | | 719/331 |
| 2011/0041179 A1* | 2/2011 | Stahlberg | G06F 21/566 |
| | | | 726/23 |
| 2011/0185350 A1* | 7/2011 | Kawahata | G06F 8/656 |
| | | | 717/171 |
| 2012/0159463 A1* | 6/2012 | Druch | G06F 8/656 |
| | | | 717/140 |
| 2012/0176641 A1* | 7/2012 | Ono | G06F 21/608 |
| | | | 358/1.14 |
| 2013/0019013 A1* | 1/2013 | Rice | H04L 61/1511 |
| | | | 709/225 |
| 2013/0055369 A1* | 2/2013 | Kumar | H04L 9/3247 |
| | | | 726/7 |
| 2013/0079032 A1* | 3/2013 | Singhal | H04W 12/06 |
| | | | 455/456.2 |
| 2013/0139185 A1* | 5/2013 | Klissner | G06F 11/3636 |
| | | | 719/328 |
| 2013/0159966 A1* | 6/2013 | Goertz | G06F 9/449 |
| | | | 717/106 |
| 2014/0307744 A1* | 10/2014 | Dunbar | H04L 45/64 |
| | | | 370/401 |
| 2015/0150025 A1* | 5/2015 | Yuen | G06F 9/544 |
| | | | 719/312 |
| 2016/0164776 A1* | 6/2016 | Biancaniello | H04L 69/22 |
| | | | 370/392 |
| 2016/0205018 A1* | 7/2016 | Li | H04L 45/021 |
| | | | 370/392 |
| 2016/0315921 A1* | 10/2016 | Dara | H04L 12/4633 |
| 2016/0344803 A1* | 11/2016 | Batz | H04M 15/66 |
| 2016/0381051 A1* | 12/2016 | Edwards | H04L 63/145 |
| | | | 726/23 |
| 2017/0033930 A1* | 2/2017 | Costa | G06F 21/606 |
| 2017/0048815 A1* | 2/2017 | Clarke | H04L 45/64 |
| 2017/0064039 A1* | 3/2017 | Shen | H04L 41/5054 |
| 2018/0089432 A1* | 3/2018 | Malachi | G06F 21/53 |
| 2018/0183658 A1* | 6/2018 | Fromentoux | H04L 41/5025 |
| 2018/0203995 A1* | 7/2018 | Yuen | G06F 21/51 |
| 2018/0288614 A1* | 10/2018 | Zaks | H04L 63/0428 |
| 2019/0042339 A1* | 2/2019 | Doshi | G06F 9/45558 |
| 2019/0075134 A1* | 3/2019 | Ylonen | H04L 63/0442 |
| 2019/0087210 A1* | 3/2019 | Dowling | G06F 9/45504 |
| 2019/0140947 A1* | 5/2019 | Zhuang | H04L 45/64 |
| 2019/0149508 A1* | 5/2019 | Silvestro | H04L 45/745 |
| | | | 709/238 |
| 2019/0172092 A1* | 6/2019 | Mouquet | H04W 64/00 |
| 2020/0042331 A1* | 2/2020 | Zhang | G06F 8/54 |
| 2020/0098466 A1* | 3/2020 | Murdoch | G16H 20/60 |
| 2020/0142735 A1* | 5/2020 | Maciocco | G06F 9/5038 |
| 2020/0225938 A1* | 7/2020 | Yuki | G06F 8/71 |
| 2021/0036860 A1* | 2/2021 | Ranganathan | H04L 63/102 |
| 2021/0099457 A1* | 4/2021 | Guo | H04L 67/306 |
| 2021/0200867 A1* | 7/2021 | Schmugar | G06F 21/572 |

* cited by examiner

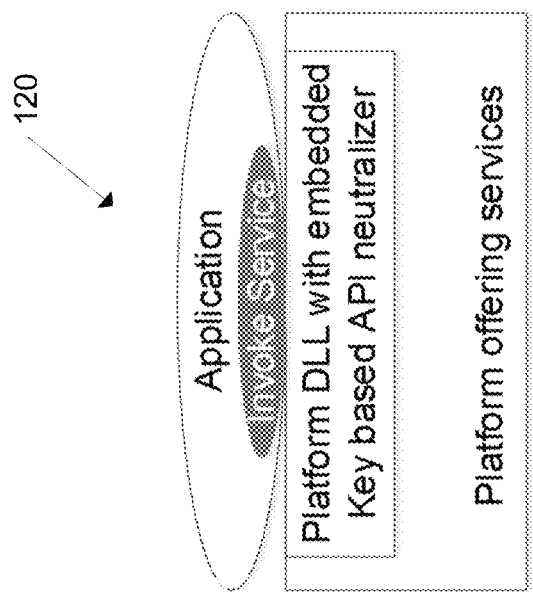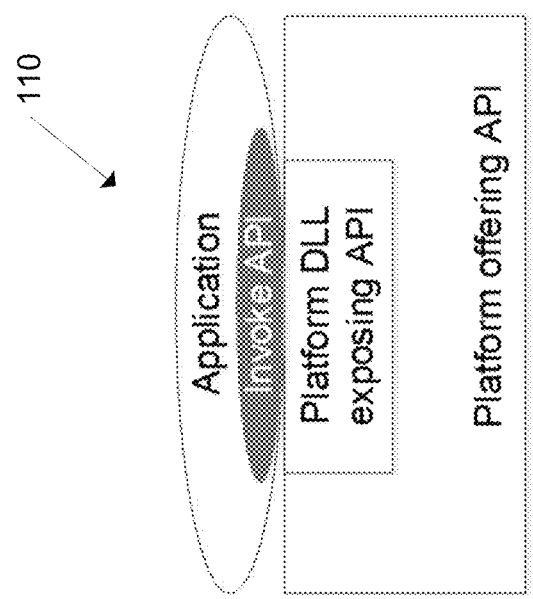
FIG. 1

| Platform DLL offering the service | | |
|---|---|---|
| Service Type | API | Count of Inputs and Input storages |
| SIP service | INVITE Message creation(X) | 3 – (method name, body, error) |
| | Send to SIP network (Y) | 3 – (message, protocol type, behaviour) |
| Diameter service | Create Request message (A) | 3(message type, data, error) |
| | Send to diameter network (B) | 2(message, protocol type) |
| Kafka service | Create Topic message (J) | 3(topic, broker IP, port) |
| | Send to Kafka broker (K) | 2(Clientid, brokerIP) |

AUTHENTICATION KEY-BASED DLL SERVICE

DESCRIPTION OF RELATED ART

In traditional dynamic linked library (DLL) applications, inputs to an application programming interface (API) are provided over the network to access web services. For example, RESTful web services receive stateless protocol communications like accessing a base uniform resource identifier (URI), such as http://api.example.com/library/ and providing standard (HyperText Transfer Protocol) HTTP methods (e.g., GET, POST, DELETE, etc.) to access corresponding functionality. However, several electronic communications need to be transmitted in these traditional systems, which creates additional network traffic and opens the backend system to security breaches.

BRIEF DESCRIPTION OF THE DRAWINGS

The present disclosure, in accordance with one or more various embodiments, is described in detail with reference to the following figures. The figures are provided for purposes of illustration only and merely depict typical or example embodiments.

FIG. 1 provides illustrations of differences between two types of systems, in accordance with embodiments of the application.

FIG. 5 provides example service types, API, and input values, in accordance with embodiments of the application.

Figure 2:
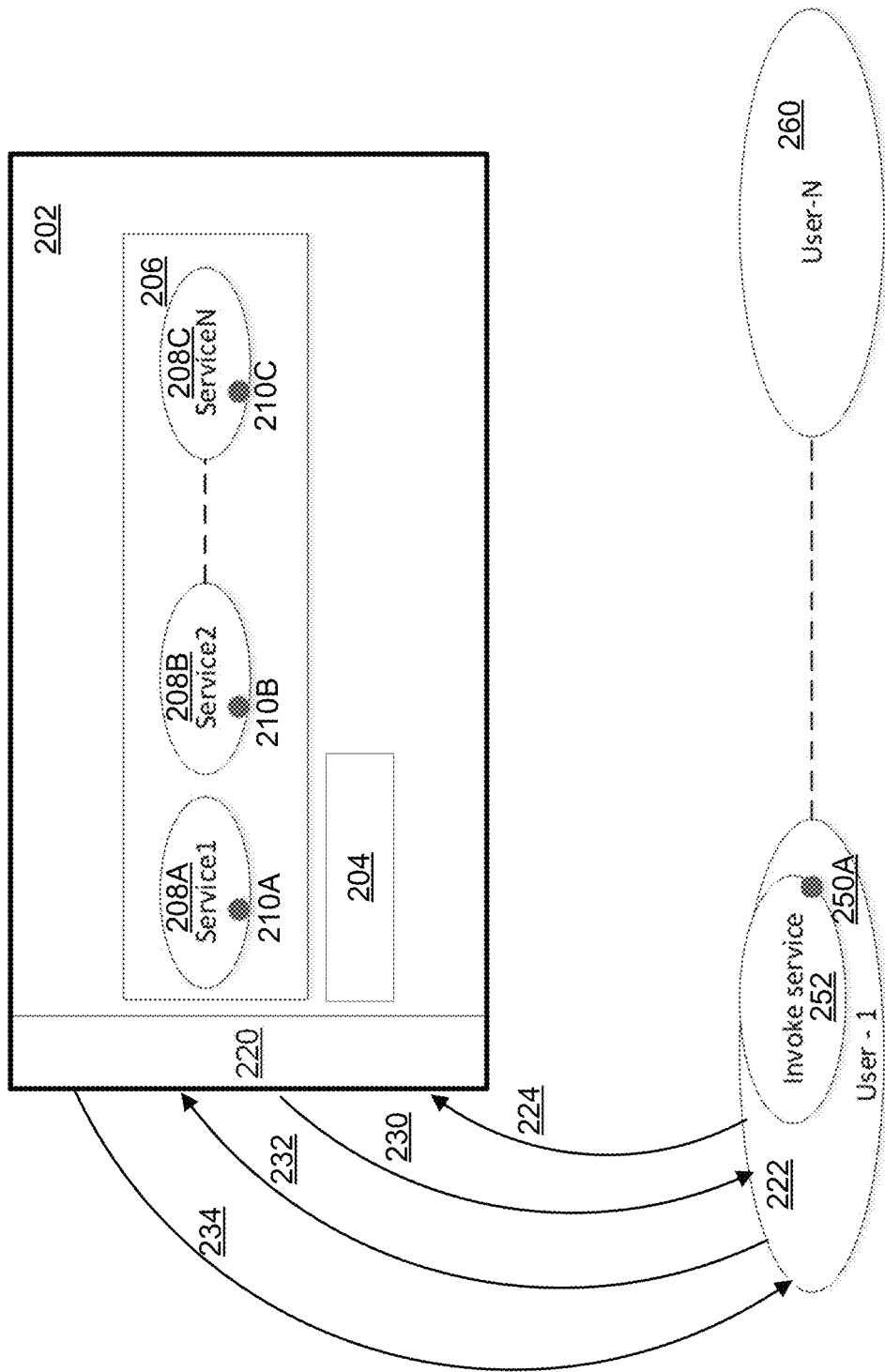
FIG. 2 provides a first illustrative communication flow, in accordance with embodiments of the application.

The figures are not exhaustive and do not limit the present disclosure to the precise form disclosed.

DETAILED DESCRIPTION

Embodiments described herein can access output from traditional DLL applications in part by sharing a key with a user and using a shared memory space for non-user data. For example, the system can expose a list of functionalities and request format as a byte string, and the byte string can denote a functionality corresponding to the API. Output is received by the user after loading a DLL library maintained by a DLL service provider. The system can receive a request from a user that denotes the service, shared memory location, and identification of the functionality that will be invoked by the user for a requested service to achieve the required functionality the user needs from the DLL provider to help load the DLL and use the service. The system can generate a key corresponding to the functionality and transmit the key to the user.

When invoking a service at a user device by loading the DLL, the key is used to authenticate the user device for the requested functionality and can be included in a service call for the DLL provider at a backend server. The key may be provided while invoking the function, along with functional parameters that correspond to the key in the byte stream. The system may authenticate the byte stream by identifying a first component of the byte stream as comprising the key and identifying a second component of the byte string as comprising the input for the functionality requested by the user device. The system may perform an action based on the authentication. For example, if the key is authenticated, the requested output is provided in response to the request (e.g., a list of the storage type, memory pointer to the data, etc.). If the key is not authenticated, at least in part, an error message may be provided.

Technical advantages are realized throughout the application. For example, in traditional systems, user data may be transmitted via the network which can increase communication traffic and potentially expose the user data to security risks. In embodiments of the application, the byte stream input and output from the system corresponding with the byte stream may be transmitted, so that user data is maintained at the user device or at a backend system and not transmitted (e.g., either encrypted or in the clear, etc.). A shared memory location may store non-user data. Additionally, any advancement on services, the API, or changes to the system can be managed dynamically without a change in the invoking service that utilizes the DLL output. For example, the DLL may be updated in the backend by unloading and loading a new DLL on intimation by the DLL provider, which can maintain constant formatting for the user to invoke. The parameters may be passed in the byte stream to API without changing the API definition (e.g., since the API may not be defined and only the list of functionalities and output based on the key may be changed).

FIG. 1 provides illustrations of differences between two types of example systems, in accordance with embodiments of the application. In first system 110, an application may invoke an API that calls to a platform offering the API. The communication may access a DLL exposing the API. In second system 120, an application may invoke a service that calls to a platform offering services. The communication may access a DLL with an embedded API for all the functionalities offered by the DLL. The communication in second system 120 may comprise the key with the communication to help authenticate the invocation of the service functionality.

Systems 110, 120 may be incorporated with a telecommunication system, for example, a 5G telecommunications system. Systems 110, 120 may offer functionalities with APIs to make the application easier to construct than traditional systems. The application may implement a protocol message of interest and send it to a protocol interface network.

Systems 110, 120 may implement functionality using similar hardware. For example, each system may comprise one or more processors and one or more memories for storing machine executable instructions. Systems 110, 120 may include network functions virtualization (NFV), software-defined networking (SDN), and/or cloud computing, such as cluster application or grid or distributed file systems. A user device may send task requests to one of systems 110, 120 by invoking a dynamic link library (DLL) application. Systems 110, 120 may perform the requested task and return a response message to the client, as explained in further detail herein.

In some examples, the functions included with the DLL may be executed by the application can be fetched from a file selected while running a command prompt at the user device. For example, the user device may provide a data string in the command prompt that includes "<application-.exe> -<loadoption> <DLL name>" where <dllname> may be "allservice.dll".

The loaded DLL may be used remotely from user device at systems 110, 120 by providing a byte string via a network connection to systems 110, 120. First system 110 may accept invocation of the API with parameters and obtain the required functionality. Second system 120 may accept the string denoting an API functionality when it includes a key and the parameters required for the specified key. Second system 120 may authenticate the invocation of the service and when the authentication process is successful, execute the functions included with the string as invocation of the functions.

FIG. 2 provides a first illustrative communication flow, in accordance with embodiments of the application. DLL provider system 202 may comprise string 204, DLL library 206 supporting multiple services comprising one or more functionalities 208 or services (illustrated as 208A, 208B, 208C), one or more keys 210 (illustrated as 210A, 210B, 210C) corresponding with one or more functionalities 208, and API 220.

In some examples, the DLL load may require the application to request initialization for the service by sending a service supported request message. For example, the application can request the list of services followed by the required function list in a proprietary message format and response would be the keys appended at the end of each function string. The request may comprise a first request from the user in order to receive the keys for the corresponding functionalities. Additional detail regarding the fetching of keys is provided with FIG. 3.

In some other examples, the application to request initialization for a service after the DLL is loaded. For example, the application can request the list of functionalities in a file and provide the input to the initialize function of the DLL. The API responds back with the list of keys that correspond to each of the functionalities. Additional detail regarding the reception of Keys during initialization is provided with FIG. 4.

DLL provider system 202 may expose DLL string 204 to user 222 and/or other users 260. String 204 may identify a list of functionalities offered by the DLL provider system 202 and a request format for the functionalities. The output for each supported functionality 208 may be stored in DLL library 206 maintained by DLL provider system 202.

User 222 may generate a request in accordance with the request format identified by string 204. The request may comprise an identification of the one or more functionalities that will be requested by user 222 from DLL provider system 202 in a second request. The functionalities may include, for example, output needed by a software application run by user 222 when user 222 invokes service 252. In this example, service 252 corresponds to functionality 208A and user-side key 250A corresponds to DLL provider-side key 210A. The functionality achieved could be a messaging service, an authentication, authorization, and accounting (AAA) protocol for computer networks, session initiation protocol (SIP), or other internet services as further illustrated by FIG. 5. In some examples, the functionalities may correspond with a user created topic or a set of functionalities associated with DLL library 206. In some examples, the request may be achieved using the requested stream of functionalities with the keys obtained during initialization.

At communication block 224, DLL provider system 202 may receive the request from user 222 via a stream of request. The request can comprise the list of requested functionalities by user 222 from DLL provider system 202.

In response, DLL provider system 202 may identify the corresponding functionality 208 and DLL library 206. DLL provider system 202 may also confirm that the functionality 208 is included in the available functionalities published with string 204. When the functionality is identified, DLL provider system 202 may generate a corresponding key 210 for the functionality requested by user 222.

As a simple illustration, user 222 may want to eventually invoke a service (e.g., SIP messaging, etc.) that requires output for a specific functionality of the service provided by a DLL stored with DLL library 206. The request may be creation of a message for the service for SIP. DLL provider system 202 may generate the key for the service.

At communication block 230, DLL provider system 202 may transmit the key 210A corresponding to service 208A to user 222 in a format as a stream of the requested service followed by the key. User 222 may store key 210A in association with service 252 at the user device.

At communication block 232, user 222 may load the DLL and invoke service 252 with the key already provided by the system 202 for a certain functionality needed, which is received at block 230. The loaded DLL may authenticate the key from user 222. Based on the authentication, the functionality is executed by the DLL.

An illustrative byte string as an input to the neutralized API is provided as: <API function name> invoked with <key> followed by memory pointer having <number of entries> <Accepted data type1> <pointer to the content for the datatype1> <Accepted data type2> <pointer to the content for the datatype2> <Accepted data type3> <pointer to the content for the datatype3> and so on as a stream of data. For example, considering the invocation of a kafka topic creation service, the application invokes it as—kafka_topic_create (buffer) where the buffer contains <32/64 bit key><address of input1—which is topic name><number of bytes to be read from input1—which could be the size of the topic name><address of input2—which is the action needed on creation><number of bytes to be read from input2—which could be 1 meaning with acknowledgement>

At communication block 234, DLL provider system 202 may perform an action based on the authentication. For example, when the byte string is authenticated, DLL provider system 202 may provide the output requested by user 222 from the DLL library 206. The output may be defined in association with the functionalities listed in the byte string, including method name, body, protocol type, broker IP, port, or other output, as illustrated with FIG. 5. In another example, when the byte string is not authenticated or authentication fails, DLL provider system 202 may provide an error message (e.g., the byte string is improper, the key is invalid or expired, the user is not authenticated, etc.).

In some examples, the key and corresponding service may not be unique to user 222. For example, second user 260 may request the same service and the list of one or more functionalities. DLL provider system 202 may authenticate the byte string as including the same key and the same one or more functionalities, and provide the corresponding output to second user 260.

In some examples, DLL provider system 202 may add functionalities supported by service 208A. To identify these additional functionalities to the users, DLL provider system 202 may update string 204 to expose a list of functionalities that are offered by the DLL provider. Changes may be made to string 204 to identify new functionalities offered by DLL library 206, without adjusting other pre-existing functionalities. In some examples, DLL provider system 202 may keep publishing updates or enhancements in the service, which may be dynamically consumed by the users. To make the new functionalities accessible, system 202 may unload the DLL with the old functionality and load a new DLL with the new functionalities. Each of the functionalities corresponding to invoked services that are supported by DLL provider system 202 may be associated with a shared memory space where DLL provider system 202 expects the inputs from the user to be placed.

In some examples, authentication key-based access to DLL services can implement a unique way to share a memory space to DLL library 206 so that DLL library 206 can receive different inputs from the user. The different inputs enable the processing of varying functionalities at run-time which may be unlocked by one or more keys. In an example, key 210 may be supplied by the service provider as a request/response from user 222 on service initialization. As another example, key 210 may be obtained during an initialization invocation on the DLL after the dynamic load. Key 210 may, in some examples, be mapped with the address from where the input is picked by the DLL library 206 with some mapping known to the service provider.

In some examples, key 210 may be limited. For example, while key 210 may be used to provide support for functionalities offered by DLL provider system 202, key 210 may also be used to limit certain functionality offered by the DLL provider system 202 (e.g., based on subscription, etc.). For example, access to a 5G functionality may be limited when the particular service is not included in the list of functionalities offered by DLL provider system 202. Samples of services that may be provided by the system are illustrated with FIG. 5.

Figure 3:
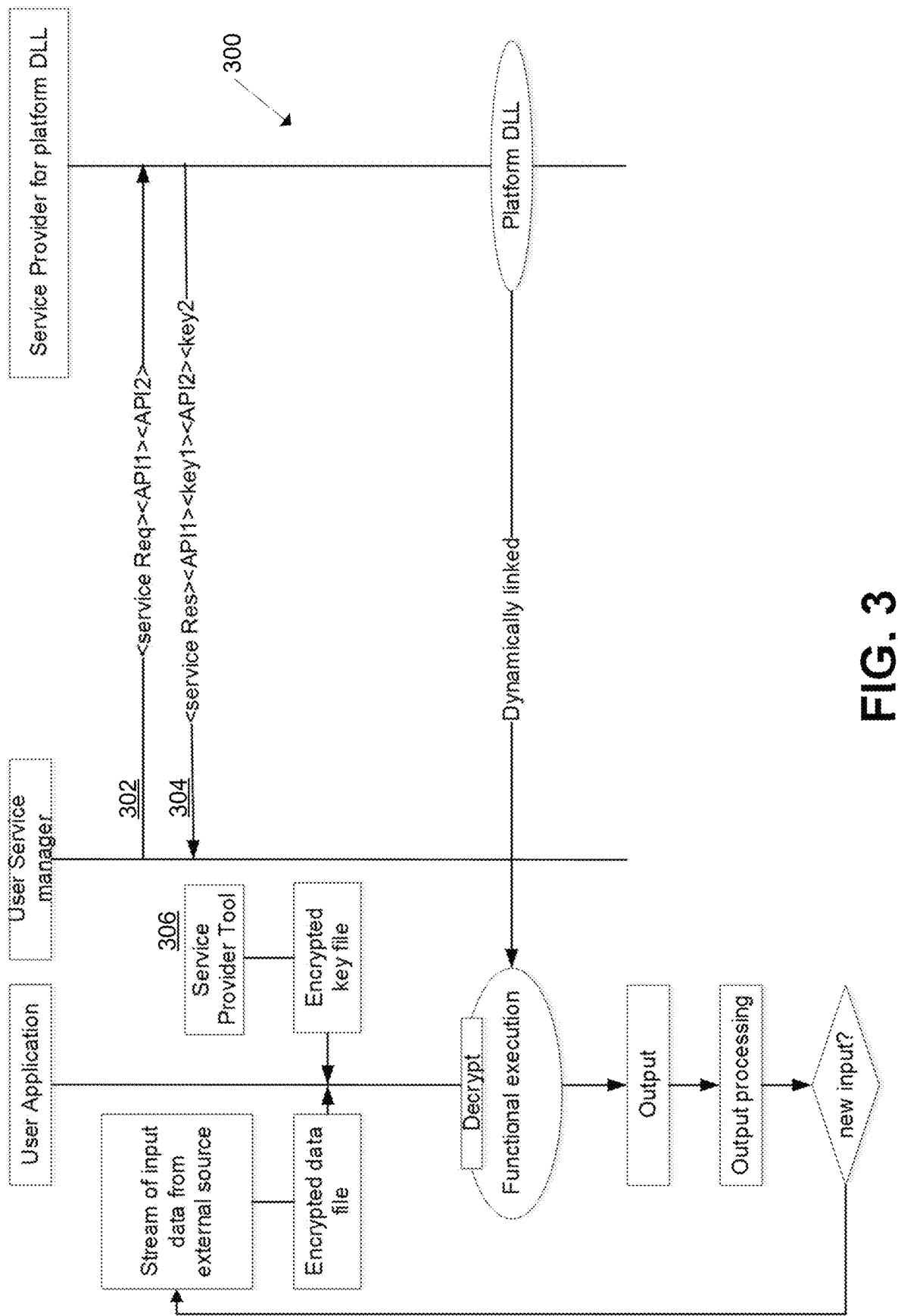
FIG. 3 provides a second illustrative communication flow, in accordance with embodiments of the application.

FIG. 3 provides a second illustrative example communication flow, in accordance with embodiments of the application. In illustration 300, service provider tool 306 may provide a key directly to a user application for functional execution of the service.

At operation 302, a service request may be transmitted to the service provider for platform DLL. The service request may include a data string that identifies a service request followed by one or more functionalities of the service supported by the service provider.

At operation 304, the DLL provider system may generate and send a response with keys for each of the functionalities and/or services requested by the user. The keys and functionalities may be included in a byte string corresponding with a second request from the users, whereas the first request corresponds with initially requesting the key(s).

At block 306, the DLL provider system may directly give a tool to generate the keys for the supported functionalities. The tool may correspond with a local software application at the user device for generating the keys on behalf of the DLL provider system. The remaining functionalities may be similar to the processes described in FIGS. 2-4.

Figure 4:
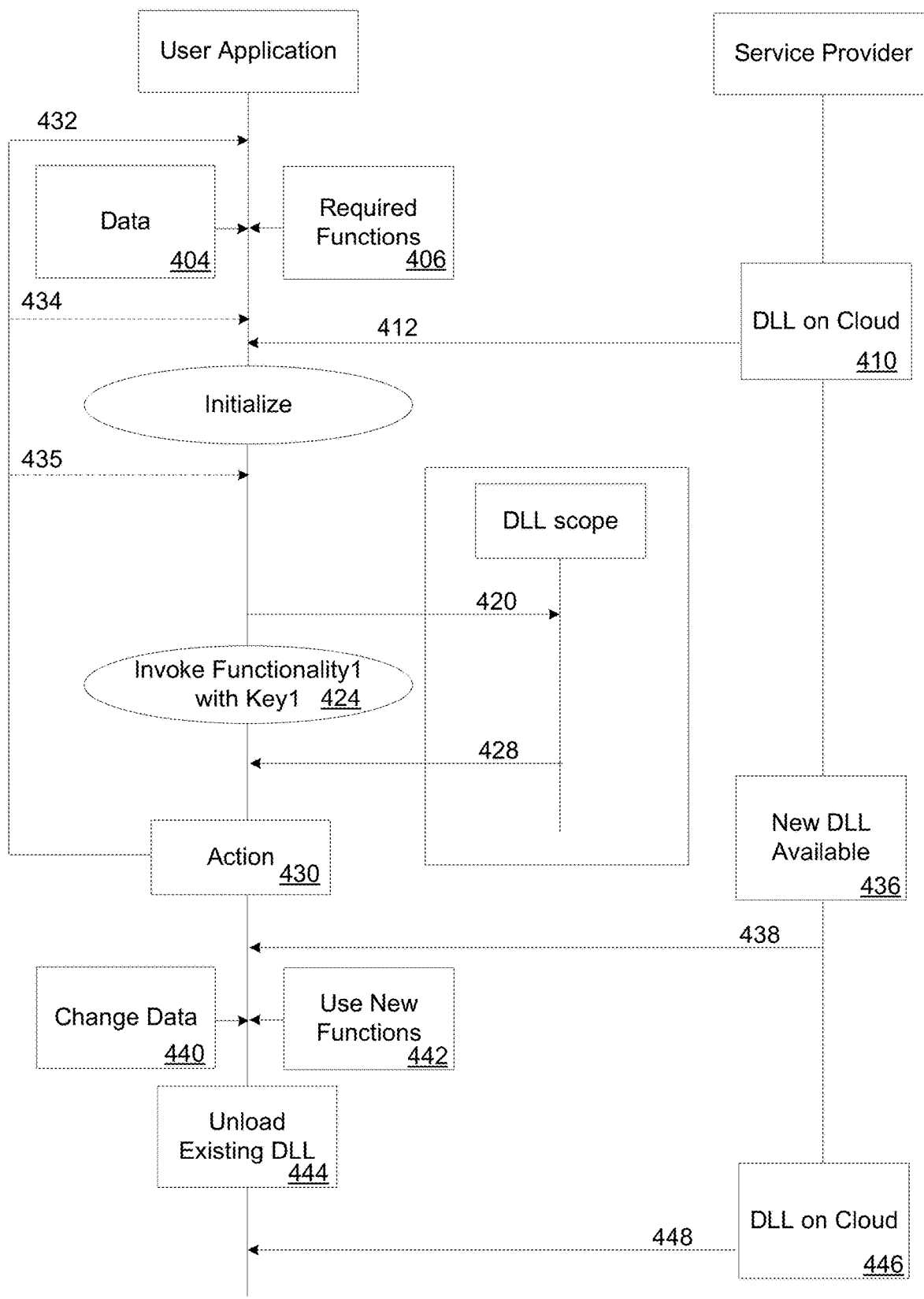
FIG. 4 provides an illustrative example of initializing an application for DLL load, in accordance with embodiments of the application.

FIG. 4 provides an illustrative example of initializing an application for DLL load, in accordance with embodiments of the application. In the sample illustration, a user application and service provider can implement the functionality of the DLL process. The user application may be executed by a user device and communicate with service provider via a communication network. Required functionalities 406 for the requested service can be given in a file along with input data 404.

At block 412, DLL 410 may be provided from service provider to user application. DLL 410 may be within the control of the service provider, for example, by enabling the service provider to generate the DLL, store or maintain the DLL in a shared memory, or control access to the DLL from other user devices or applications. Input data 404 may be stored in the memory during initialization after loading the DLL.

At block 420, the API may be called by invoking functionality with the byte stream. The byte stream may comprise the DLL supported key for the functionality, followed by a memory space pointer corresponding to the key from where the DLL can fetch the input from the user. The memory space pointer may be directed to a shared memory space.

At block 428, the output of the execution (e.g., the end result) is copied back to the shared memory space. In examples where an error is encountered, the output may be returned with the error code for the function invocation. The output and/or error code may be checked with an action by the user application in 430.

Between block 420 and block 428, the DLL validates the key and corresponding functionality. If the key is authentic and authentication is successful, the end result is provided back in block 428.

At block 430, based on the output of block 428, the action may be performed. For example, the user application can determine whether to give new data 432, re-initialize for new functionalities in 434, or continue to use the same function illustrated at 424. For example, when an error is generated as output, the determination may generate new data 432. In another example, at block 435, the application makes the decision of invoking the same 424 functionality based on the output validations.

In some examples, the service provider could have made one or more improvements or other technical advancement to the already used functionality of the DLL and generate new DLL 436. The service provider may use the same DLL structure and incorporate the functional advancement with new DLL 436.

In some examples, the service provider can generate and transmit a message to a list of users to identify the users using the service DLL at any point of time. In some examples, the identification of users using the service DLL can be incorporated with an interface and proactively transmitted to the interface for the user devices to receive and respond. The service provider may transmit an electronic communication to identify use of the service DLL (e.g., including a query or opt-in communication). The service provider may receive responses from the user devices that are using the service DLL. Once the list of users is determined, the service provider and can intimate a message 438 to the users. The message may provide details on the advanced functionalities available for the service.

The user application can use the new advancements of the same functions with no change in operation 442 by providing new input data 440 for the support of the new functionality with no change to the user application.

At operation 444, the user application may choose to unload the existing DLL in 444, reload the new DLL in 448, and continue with the initialization. As in some cases, operation 442 can correspond with new functionalities added to the same service. In some examples, the user application may unload the existing DLL in view of the new DLL available.

At block 446, the service provider may provide a new DLL on a network location, including a cloud storage accessible by the user application.

At operation 448, the service provider may load the DLL to the user application once the user application has unloaded the existing DLL. In this example, the DLL may be loaded to the user application from the cloud or other shared memory storage.

An illustrative example of the process in FIG. 4 may correspond with Kafka service applications. For example, the service provider may offer one or more functions for implementing the Kafka service application, including functions DLOPEN and DLSYM stored with DLL supporting Kafka functionality. These functions may be associated with a new service DLL from a shared memory location (e.g., cloud storage). User application may invoke an API function in association with information stored in a configuration file (e.g., functions, keys, etc.). The configuration information may be used to invoke the API with input data in order to produce output data. The user application may invoke a call-back for action and receive a library upgrade notification from a system manager when new functionality is available. The user application may handle the notification (e.g., by storing data in association with the notification or executing an action, etc.). The user application may implement DLCLOSE on the current DLL and/or continue to use older services available from the system manager. The system manager may also alert the user application to new library services provided by the system manager to one or more user applications.

FIG. 5 provides example service types, API, and input values, in accordance with embodiments of the application. In illustration 500, service types (e.g., including session initiation protocol (SIP), an authentication, authorization, and accounting (AAA) protocol for computer networks, a messaging service (Kafka), etc.), APIs, and inputs (e.g., method name, body, error, protocol type, behavior, message type, data, message, topic, broker IP, port, clientID, etc.) are provided via DLL service provider.

Service types may correspond with string data from a user device. For example, the first column defines potential services supported by the DLL. The second column correspond to the functionalities that may be permitted. Considering the first SIP service use case, the user first receives the keys for these functionalities which are "invite to create" or "send to SIP network." The user device may be enabled to invoke an "invite to create" service. The platform DLL may receive three inputs with the data string, including a method name, body of the invitation, and error. The data string may include, for example, "123456 3 invitetocreate-pointer methodname-pointer body-pointer error" where the key corresponds to the invite creation functionality of the SIP service in the shared memory location. The user device may also be enabled to invoke a "send to SIP network" service with a different key. The platform DLL may receive three inputs with the data string, including a message, protocol type, and behavior. The data string may include, for example, "2345678 3 sendtoSIPnetwork-pointer message-pointer protocol behavior-pointer" where the key corresponding to the send to SIP network functionality of this service is "2345678."

In another example, the user device may be enabled to invoke a "create request message" for diameter service. The platform DLL may receive three inputs with the data string, including a message type, data, and error. The data string may include, for example, "34567 3 messagetype-pointer data-pointer error-pointer" where the key corresponding with this service is "34567." The user device may also be enabled to invoke a "sendtodiameternetwork" service. The platform DLL may receive two inputs with the data string, including a message and protocol type. The data string may include, for example, "45678 2 message-pointer protocoltype-pointer" where the key corresponding with this service is "45678."

In another example, the user device may be enabled to invoke a "create topic message" service. The platform DLL may receive three inputs with the key, including a topic, broker IP, and port. The data string may include, for example, "56789 3 topic-pointer brokerIP-pointer port-pointer," where the key corresponding with this service is "56789." The user device may also be enabled to invoke a "Send To Kafka Broker" service. The platform DLL may receive two inputs with the data string, including a client ID and broker IP. The data string may include, for example, "6789 2 clientID-pointer brokerIP-pointer" where the key corresponding with this service is "6789."

Figure 6:
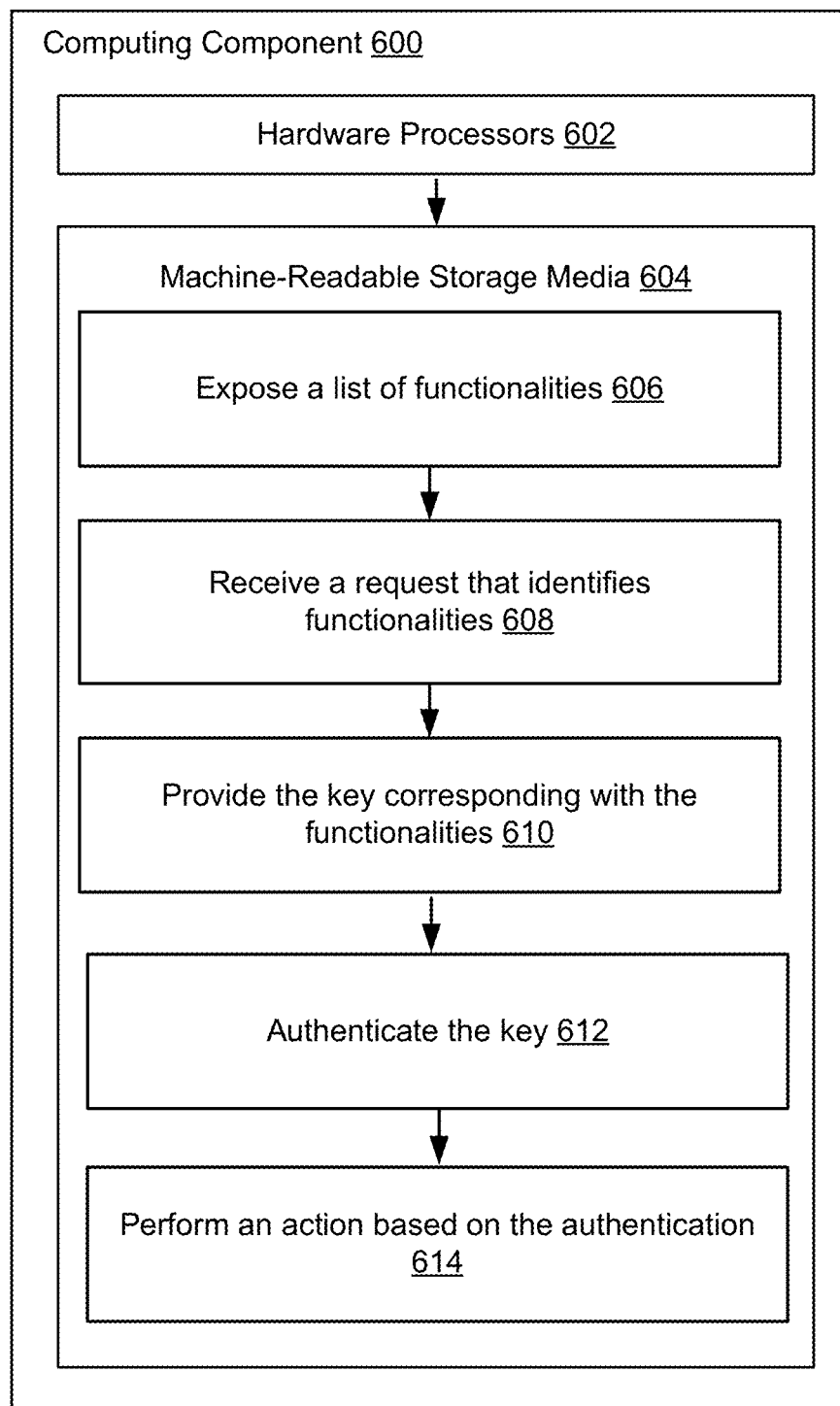
FIG. 6 illustrates a computing component for providing a key-based API neutralizer, in accordance with embodiments of the application.

FIG. 6 illustrates an example iterative process performed by a computing component 600 for providing a key based API neutralizer. Computing component 600 may be, for example, a server computer, a controller, or any other similar computing component capable of processing data. In the example implementation of FIG. 6, the computing component 600 includes a hardware processor 602, and machine-readable storage medium 604. In some embodiments, computing component 600 may be an embodiment of a system corresponding with second system 120 of FIG. 1 or DLL provider system 202 of FIG. 2.

Hardware processor 602 may be one or more central processing units (CPUs), semiconductor-based microprocessors, and/or other hardware devices suitable for retrieval and execution of instructions stored in machine-readable storage medium 604. Hardware processor 602 may fetch, decode, and execute instructions, such as instructions 606-614, to control processes or operations for optimizing the system during run-time. As an alternative or in addition to retrieving and executing instructions, hardware processor 602 may include one or more electronic circuits that include electronic components for performing the functionality of one or more instructions, such as a field programmable gate array (FPGA), application specific integrated circuit (ASIC), or other electronic circuits.

A machine-readable storage medium, such as machine-readable storage medium 604, may be any electronic, magnetic, optical, or other physical storage device that contains or stores executable instructions. Thus, machine-readable storage medium 604 may be, for example, Random Access Memory (RAM), non-volatile RAM (NVRAM), an Electrically Erasable Programmable Read-Only Memory (EEPROM), a storage device, an optical disc, and the like. In some embodiments, machine-readable storage medium 604 may be a non-transitory storage medium, where the term "non-transitory" does not encompass transitory propagating signals. As described in detail below, machine-readable storage medium 604 may be encoded with executable instructions, for example, instructions 606-514.

Hardware processor 602 may execute instruction 606 to expose a string that identifies a list of functionalities. For example, a DLL provider system may expose the string, e.g. by posting the string at an online location that is accessible by one or more users. The output may be received from a DLL library maintained by the DLL provider system. The string may include one or more functionalities corresponding to the output, including for example: <API function name> <key> <number of entries><Accepted data type1> <pointer to the content for the datatype1> <Accepted data type2> <pointer to the content for the datatype2> <Accepted data type3> <pointer to the content for the datatype3>.

Hardware processor 602 may execute instruction 608 to receive a request that identifies functionalities. The request may comprise an identification of the one or more functionalities that can be requested by the user. For example, the system can expose a string that identifies the functionality and the output is received from a DLL library maintained by a DLL provider, and the string includes a functionality corresponding to the output. The user device can generate a byte string that comprises a request for one or more functionalities.

Hardware processor 602 may execute instruction 610 to provide the key that corresponds to the one or more functionalities that can be requested by the user. For example, the system can generate the key with the original offering of the list of functionalities, retrieve the key upon receiving the request, and provide the key in response. The system can generate a key corresponding to the functionality and transmit the key to the user. The key may be requested upon invocation of the DLL.

Hardware processor 602 may execute instruction 612 to authenticate the key. For example, when the key is received within a byte string from the user application, the byte string may be authenticated by identifying a first component of the byte string as comprising the key. The authentication may also identify a second component of the byte string as comprising one or more functionalities requested by the user.

Hardware processor 602 may execute instruction 614 to perform an action based on the authentication. For example, when the byte string is authenticated, the DLL provider system may process the byte string and transmit output as defined in association with the byte string to the user. The output may be generated from the DLL library. In another example, when the byte string is not authenticated or when the authentication fails, the DLL provider system may provide an error message to the user.

In some examples, the user may generate a software application that invokes a service that requires one or more functionalities from a DLL library in order for the service to execute. The software application may generate the byte string that includes the key corresponding to the requested functionalities. The user device may invoke the functionality from the loaded DLL with the byte stream and the output provided by the DLL provider system may be used in operation of the user service.

In some examples, changes to the service may be extensible with use of the byte string and the key. Any changes to the DLL library may not require reprogramming of the user service.

The user data may be maintained within the software application. In some examples, user data may not be provided via the network between the user and the DLL provider, and the output is achieved within the user scope with the loaded DLL.

In some examples, hardware processor 602 may execute an instruction to provide the key to the user via a public API. In some examples, the request may be received from the user via the public API.

In some examples, hardware processor 602 may execute an instruction to transmit the key generated by the DLL provider from the DLL library. In some examples, hardware processor 602 may execute an instruction to store the key generated by the DLL library.

In some examples, hardware processor 602 may execute an instruction to dynamically increment functionalities received from the DLL library and offered as the output to the user. The DLL provider system may update the string that identifies the request format for output to correspond with the incremented functionalities.

Figure 7:
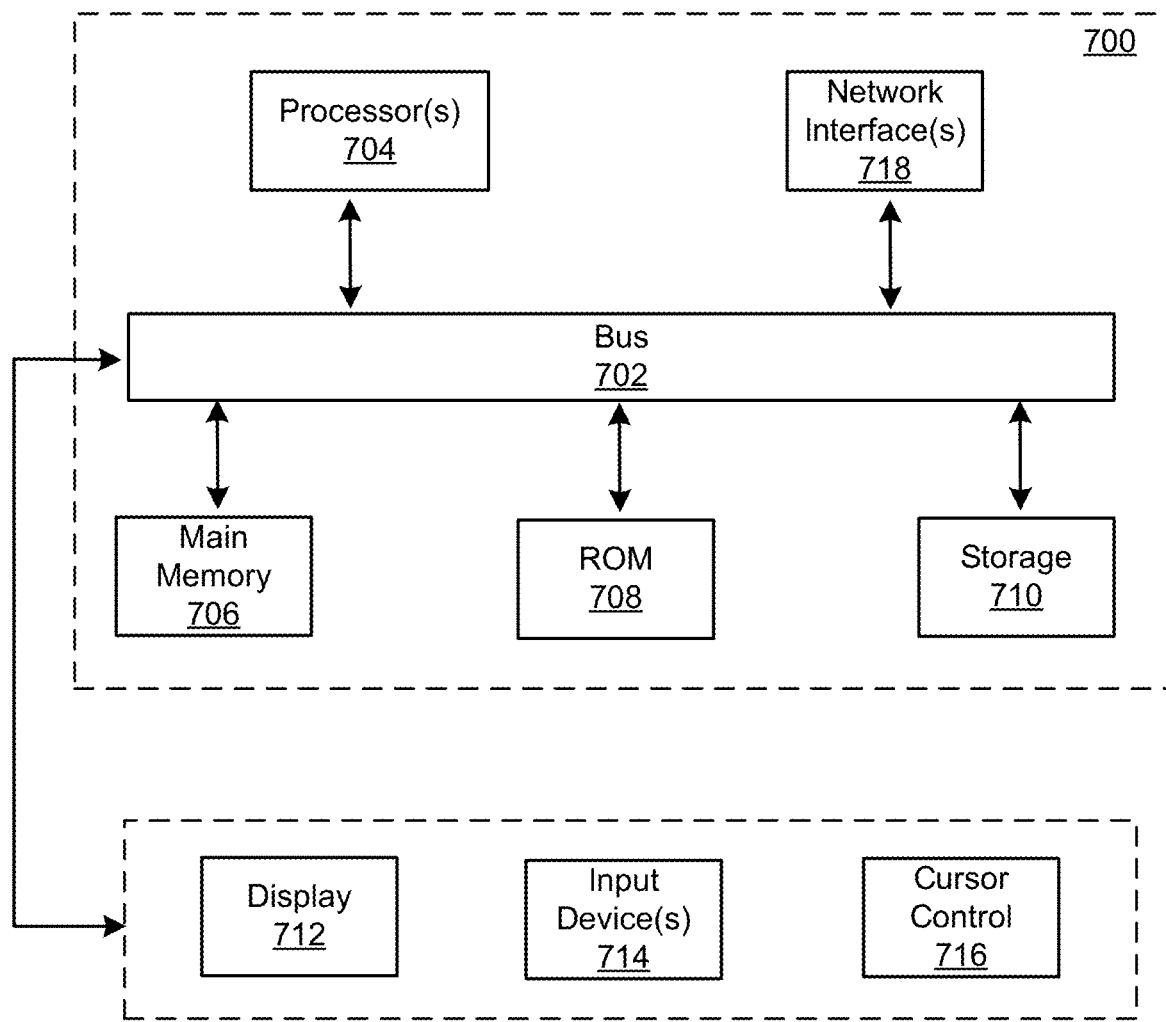
FIG. 7 is an example computing component that may be used to implement various features of embodiments described in the present disclosure.

FIG. 7 depicts a block diagram of an example computer system 700 in which various of the embodiments described herein may be implemented. The computer system 700 includes a bus 702 or other communication mechanism for communicating information, one or more hardware processors 704 coupled with bus 702 for processing information. Hardware processor(s) 604 may be, for example, one or more general purpose microprocessors.

The computer system 700 also includes a main memory 706, such as a random access memory (RAM), cache and/or other dynamic storage devices, coupled to bus 702 for storing information and instructions to be executed by processor 704. Main memory 706 also may be used for storing temporary variables or other intermediate information during execution of instructions to be executed by processor 704. Such instructions, when stored in storage media accessible to processor 704, render computer system 700 into a special-purpose machine that is customized to perform the operations specified in the instructions.

The computer system 700 further includes a read only memory (ROM) 708 or other static storage device coupled to bus 702 for storing static information and instructions for processor 604. A storage device 710, such as a magnetic disk, optical disk, or USB thumb drive (Flash drive), etc., is provided and coupled to bus 702 for storing information and instructions.

The computer system 700 may be coupled via bus 702 to a display 712, such as a liquid crystal display (LCD) (or touch screen), for displaying information to a computer user. An input device 714, including alphanumeric and other keys, is coupled to bus 702 for communicating information and command selections to processor 704. Another type of user input device is cursor control 716, such as a mouse, a trackball, or cursor direction keys for communicating direction information and command selections to processor 704 and for controlling cursor movement on display 712. In some embodiments, the same direction information and command selections as cursor control may be implemented via receiving touches on a touch screen without a cursor.

The computing system 700 may include a user interface module to implement a GUI that may be stored in a mass storage device as executable software codes that are executed by the computing device(s). This and other modules may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables.

In general, the word "component," "engine," "system," "database," data store," and the like, as used herein, can refer to logic embodied in hardware or firmware, or to a collection of software instructions, possibly having entry and exit points, written in a programming language, such as, for example, Java, C or C++. A software component may be compiled and linked into an executable program, installed in a dynamic link library, or may be written in an interpreted programming language such as, for example, BASIC, Perl, or Python. It will be appreciated that software components may be callable from other components or from themselves, and/or may be invoked in response to detected events or interrupts. Software components configured for execution on computing devices may be provided on a computer readable medium, such as a compact disc, digital video disc, flash drive, magnetic disc, or any other tangible medium, or as a digital download (and may be originally stored in a compressed or installable format that requires installation, decompression or decryption prior to execution). Such software code may be stored, partially or fully, on a memory device of the executing computing device, for execution by the computing device. Software instructions may be embedded in firmware, such as an EPROM. It will be further appreciated that hardware components may be comprised of connected logic units, such as gates and flip-flops, and/or may be comprised of programmable units, such as programmable gate arrays or processors.

The computer system 700 may implement the techniques described herein using customized hard-wired logic, one or more ASICs or FPGAs, firmware and/or program logic which in combination with the computer system causes or programs computer system 700 to be a special-purpose machine. According to one embodiment, the techniques herein are performed by computer system 700 in response to processor(s) 704 executing one or more sequences of one or more instructions contained in main memory 706. Such instructions may be read into main memory 606 from another storage medium, such as storage device 710. Execution of the sequences of instructions contained in main memory 706 causes processor(s) 604 to perform the process steps described herein. In alternative embodiments, hard-wired circuitry may be used in place of or in combination with software instructions.

The term "non-transitory media," and similar terms, as used herein refers to any media that store data and/or instructions that cause a machine to operate in a specific fashion. Such non-transitory media may comprise non-volatile media and/or volatile media. Non-volatile media includes, for example, optical or magnetic disks, such as storage device 710. Volatile media includes dynamic memory, such as main memory 706. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, and networked versions of the same.

Non-transitory media is distinct from but may be used in conjunction with transmission media. Transmission media participates in transferring information between non-transitory media. For example, transmission media includes coaxial cables, copper wire and fiber optics, including the wires that comprise bus 702. Transmission media can also take the form of acoustic or light waves, such as those generated during radio-wave and infra-red data communications.

The computer system 700 also includes a communication interface 718 coupled to bus 702. Communication interface 718 provides a two-way data communication coupling to one or more network links that are connected to one or more local networks. For example, communication interface 718 may be an integrated services digital network (ISDN) card, cable modem, satellite modem, or a modem to provide a data communication connection to a corresponding type of telephone line. As another example, communication interface 718 may be a local area network (LAN) card to provide a data communication connection to a compatible LAN (or WAN component to communicated with a WAN). Wireless links may also be implemented. In any such implementation, communication interface 718 sends and receives electrical, electromagnetic or optical signals that carry digital data streams representing various types of information.

A network link typically provides data communication through one or more networks to other data devices. For example, a network link may provide a connection through local network to a host computer or to data equipment operated by an Internet Service Provider (ISP). The ISP in turn provides data communication services through the world wide packet data communication network now commonly referred to as the "Internet." Local network and Internet both use electrical, electromagnetic or optical signals that carry digital data streams. The signals through the various networks and the signals on network link and through communication interface 618, which carry the digital data to and from computer system 700, are example forms of transmission media.

The computer system 700 can send messages and receive data, including program code, through the network(s), network link and communication interface 718. In the Internet example, a server might transmit a requested code for an application program through the Internet, the ISP, the local network and the communication interface 718.

The received code may be executed by processor 704 as it is received, and/or stored in storage device 710, or other non-volatile storage for later execution.

Each of the processes, methods, and algorithms described in the preceding sections may be embodied in, and fully or partially automated by, code components executed by one or more computer systems or computer processors comprising computer hardware. The one or more computer systems or computer processors may also operate to support performance of the relevant operations in a "cloud computing" environment or as a "software as a service" (SaaS). The processes and algorithms may be implemented partially or wholly in application-specific circuitry. The various features and processes described above may be used independently of one another, or may be combined in various ways. Different combinations and sub-combinations are intended to fall within the scope of this disclosure, and certain method or process blocks may be omitted in some implementations. The methods and processes described herein are also not limited to any particular sequence, and the blocks or states relating thereto can be performed in other sequences that are appropriate, or may be performed in parallel, or in some other manner. Blocks or states may be added to or removed from the disclosed example embodiments. The performance of certain of the operations or processes may be distributed among computer systems or computers processors, not only residing within a single machine, but deployed across a number of machines.

As used herein, a circuit might be implemented utilizing any form of hardware, software, or a combination thereof. For example, one or more processors, controllers, ASICs, PLAs, PALs, CPLDs, FPGAs, logical components, software routines or other mechanisms might be implemented to make up a circuit. In implementation, the various circuits described herein might be implemented as discrete circuits or the functions and features described can be shared in part or in total among one or more circuits. Even though various features or elements of functionality may be individually described or claimed as separate circuits, these features and functionality can be shared among one or more common circuits, and such description shall not require or imply that separate circuits are required to implement such features or functionality. Where a circuit is implemented in whole or in part using software, such software can be implemented to operate with a computing or processing system capable of carrying out the functionality described with respect thereto, such as computer system 700.

As used herein, the term "or" may be construed in either an inclusive or exclusive sense. Moreover, the description of resources, operations, or structures in the singular shall not be read to exclude the plural. Conditional language, such as, among others, "can," "could," "might," or "may," unless specifically stated otherwise, or otherwise understood within the context as used, is generally intended to convey that certain embodiments include, while other embodiments do not include, certain features, elements and/or steps.

Terms and phrases used in this document, and variations thereof, unless otherwise expressly stated, should be construed as open ended as opposed to limiting. Adjectives such as "conventional," "traditional," "normal," "standard," "known," and terms of similar meaning should not be construed as limiting the item described to a given time period or to an item available as of a given time, but instead should be read to encompass conventional, traditional, normal, or standard technologies that may be available or known now or at any time in the future. The presence of broadening words and phrases such as "one or more," "at least," "but not limited to" or other like phrases in some instances shall not be read to mean that the narrower case is intended or required in instances where such broadening phrases may be absent.

What is claimed is:

1. A computer-implemented method comprising:
   exposing, by a dynamic linked library (DLL) service provider, a list of functionalities supported for a service, wherein the list of functionalities correspond with a key generated or available from the DLL service provider;
   receiving, by the DLL service provider, a request comprising a byte stream denoting the service, a shared memory location, and one or more functionalities from the list of functionalities;
   receiving an indication of initialization of a DLL with an application programming interface (API);
   in response to the indication of initialization, transmitting, by the DLL service provider, the key generated or available from the DLL service provider corresponding to the one or more functionalities to the user, wherein the key is authenticated and provided as input to the API;
   upon successful authentication, fetching, by the DLL service provider, data from the shared memory location provided in the byte stream; and
   performing, by the DLL service provider, an action based on the data from the shared memory location.

2. The computer-implemented method of claim 1, further comprising: providing, from the DLL service provider, the key after loading the DLL.

3. The computer-implemented method of claim 1, further comprising: selecting, by the DLL service provider, an input format to be fetched from a shared memory of the user.

4. The computer-implemented method of claim 1, wherein, responsive to a change to the list of functionalities associated with the key, the DLL service provider transmits an alert to unload and load a new DLL with no change to the service at run-time.

5. The computer-implemented method of claim 1, wherein the action comprises transmitting an output generated by the DLL back to the user to accomplish the one or more functionalities from the list of functionalities.

6. The computer-implemented method of claim 1, wherein the action comprises providing an error message indicating that at least a part of the authentication failed.

7. The computer-implemented method of claim 1, wherein the request is transmitted by a user, and wherein data from the shared memory location does not include data of the user, wherein the user data is maintained locally with a user device of the user and not shared via a communication network between the user device and the DLL service provider.

8. The computer-implemented method of claim 1, wherein the key is stored in a DLL library maintained by the DLL service provider.

9. The computer-implemented method of claim 1, wherein the DLL service provider is further enabled to:
   dynamically increment functionalities received from the DLL library and offered as output to a user; and
   update the key generated or available from the DLL service provider to correspond with the incremented functionalities.

10. A DLL provider system, comprising:
    a memory; and
    one or more processors configured to execute machine readable instructions stored in the memory for performing the method comprising:
       exposing a list of functionalities supported for a service, wherein the list of functionalities correspond with a key generated or available from the DLL provider system;
       receiving a request, wherein the request comprises a byte stream denoting the service, a shared memory location, and one or more functionalities from the list of functionalities;
       receiving an indication of initialization of a DLL with an application programming interface (API);
       in response to the indication of initialization, transmitting the key generated or available from the DLL provider system corresponding to the one or more functionalities, wherein the key is authenticated and provided as input to the API;
       upon successful authentication, fetching data from the shared memory location provided in the byte stream; and
       performing an action based on the data from the shared memory location.

11. The DLL provider system of claim 10, the method further comprising: providing the key after loading the DLL.

12. The DLL provider system of claim 10, the method further comprising: selecting an input format to be fetched from a shared memory of the user.

13. The DLL provider system of claim 10, wherein changes to the list of functionalities associated with the key transmits an alert to unload and load a new DLL with no change to the service at run-time.

14. The DLL provider system of claim 10, wherein the action comprises transmitting output generated by the DLL back to the user to accomplish the one or more functionalities from the list of functionalities.

15. The DLL provider system of claim 10, wherein the action comprises providing an error message to identify that at least a part of the authentication failed.

16. The DLL provider system of claim 10, wherein data from the shared memory location does not include user data, and wherein the user data is maintained with a software application and not provided via a communication network between the user and the DLL service provider.

17. The DLL provider system of claim 10, wherein the key is stored in a DLL library maintained by the DLL service provider.

18. The DLL provider system of claim 10, the method further comprising:
dynamically increment functionalities received from the DLL library and offered as output to the user; and
update the key generated or available from the DLL service provider to correspond with the incremented functionalities.

19. A non-transitory computer-readable storage medium storing a plurality of instructions executable by one or more processors, the plurality of instructions when executed by the one or more processors cause the one or more processors to:
expose a list of functionalities supported for a service, wherein the list of functionalities correspond with a key generated or available from a DLL service provider;
receive a request, wherein the request comprises a byte stream denoting the service, a shared memory location, and one or more functionalities from the list of functionalities;
receive an indication of initialization of a DLL with an application programming interface (API);
in response to the indication of initialization, transmit the key generated or available from the DLL service provider corresponding to the one or more functionalities, wherein the key is authenticated and provided as input to the API;
upon successful authentication, fetch data from the shared memory location provided in the byte stream; and
perform an action based on the data from the shared memory location.

20. The non-transitory computer-readable storage medium of claim 19, wherein changes to the list of functionalities associated with the key transmits an alert to unload and load a new DLL with no change to the service at run-time.

* * * * *